(12) United States Patent
Ishihara

(10) Patent No.: US 10,934,206 B2
(45) Date of Patent: Mar. 2, 2021

(54) TOP PLATE FOR COOKING DEVICE

(71) Applicant: Nippon Electric Glass Co., Ltd., Shiga (JP)

(72) Inventor: Kentaro Ishihara, Shiga (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 233 days.

(21) Appl. No.: 15/551,376

(22) PCT Filed: Feb. 18, 2016

(86) PCT No.: PCT/JP2016/054674
§ 371 (c)(1),
(2) Date: Aug. 16, 2017

(87) PCT Pub. No.: WO2016/136576
PCT Pub. Date: Sep. 1, 2016

(65) Prior Publication Data
US 2018/0029927 A1 Feb. 1, 2018

(30) Foreign Application Priority Data
Feb. 25, 2015 (JP) ............... JP2015-034942

(51) Int. Cl.
*C03C 14/00* (2006.01)
*C03C 3/066* (2006.01)
(Continued)

(52) U.S. Cl.
CPC ............ *C03C 14/004* (2013.01); *C03C 3/066* (2013.01); *C03C 3/14* (2013.01); *C03C 3/19* (2013.01);
(Continued)

(58) Field of Classification Search
CPC ....... C03C 14/004; C03C 10/00; C03C 3/066; C03C 3/19; C03C 17/25
(Continued)

(56) References Cited

U.S. PATENT DOCUMENTS

2006/0127498 A1* 6/2006 Sugiura ............... A01N 59/14
424/618
2010/0089905 A1* 4/2010 Nelson .................. H05B 3/74
219/452.11
(Continued)

FOREIGN PATENT DOCUMENTS

FR 2 732 960 10/1996
JP 61-43296 9/1986
(Continued)

OTHER PUBLICATIONS

International Search Report dated May 24, 2016 in International (PCT) Application No. PCT/JP2016/054674.
(Continued)

*Primary Examiner* — Thien S Tran
(74) *Attorney, Agent, or Firm* — Wenderoth, Lind & Ponack, L.L.P.

(57) ABSTRACT

A technical object of the present invention is to devise a top plate for a cooking appliance that can suppress proliferation of bacteria or mold. In order to achieve the technical object, the top plate for a cooking appliance of the present invention includes: a crystallized glass substrate having a cooking surface on which a cooking device is placed; and a decorative layer formed on the cooking surface, in which the decorative layer includes 30 vol % to 100 vol % of ZnO—$B_2O_3$-based glass and 0 vol % to 70 vol % of refractory filler powder.

6 Claims, 1 Drawing Sheet

(51) Int. Cl.
  F24C 15/10    (2006.01)
  C03C 3/14     (2006.01)
  H05B 6/12     (2006.01)
  C03C 3/19     (2006.01)
  C03C 10/00    (2006.01)
  C03C 17/25    (2006.01)
  H05B 3/74     (2006.01)

(52) U.S. Cl.
  CPC .............. *C03C 10/00* (2013.01); *C03C 17/25* (2013.01); *F24C 15/10* (2013.01); *H05B 3/74* (2013.01); *H05B 6/12* (2013.01); *C03C 2204/02* (2013.01); *C03C 2214/04* (2013.01); *C03C 2217/213* (2013.01); *C03C 2217/214* (2013.01); *C03C 2217/216* (2013.01); *C03C 2217/228* (2013.01); *C03C 2217/23* (2013.01); *C03C 2217/72* (2013.01); *C03C 2218/119* (2013.01)

(58) Field of Classification Search
  USPC .................. 219/452.11; 428/141, 147, 210
  See application file for complete search history.

(56) References Cited

U.S. PATENT DOCUMENTS

| | | |
|---|---|---|
| 2013/0164509 A1 | 6/2013 | Siebers et al. |
| 2013/0273320 A1* | 10/2013 | Bockmeyer ........... C03C 17/007 428/147 |

FOREIGN PATENT DOCUMENTS

| | | | |
|---|---|---|---|
| JP | 2000-226231 | | 8/2000 |
| JP | 2002-37643 | | 2/2002 |
| JP | 2002037643 | * | 2/2002 |
| JP | 2004-262763 | | 9/2004 |
| JP | 2007-005318 | | 1/2007 |
| JP | 2007-165332 | | 6/2007 |
| JP | 3971059 | | 9/2007 |
| JP | 2010-71515 | | 4/2010 |
| JP | 2010071515 A | * | 4/2010 |
| JP | 4998016 | | 8/2012 |
| JP | 2013-82615 | | 5/2013 |

OTHER PUBLICATIONS

Extended European Search Report dated Aug. 21, 2018 in corresponding European Patent Application No. 16755323.9.
International Preliminary Report on Patentability and Written Opinion of the International Searching Authority dated Aug. 29, 2017 in International Application No. PCT/JP2016/054674.
Communication pursuant to Article 94(3) EPC dated Oct. 18, 2019 in corresponding European Patent Application No. 16755323.9.

* cited by examiner

TOP PLATE FOR COOKING DEVICE

TECHNICAL FIELD

The present invention relates to a top plate for a cooking appliance to be mounted on top of the cooking appliance.

BACKGROUND ART

A top plate for a cooking appliance is mounted on top of the cooking appliance, such as an electromagnetic cooking appliance or a gas cooking appliance. A cooking device, such as a pot, is placed on the top plate for a cooking appliance, and the cooking device is heated for cooking with a heating device in the cooking appliance. In particular, the electromagnetic cooking appliance has high safety, and hence the demand for the electromagnetic cooking appliance has tended to be increasingly growing. Along with this, also the demand for the top plate for a cooking appliance has been increasing. As a substrate for such top plate for a cooking appliance, a low-expansion crystallized glass substrate is used. For example, in Patent Literatures 1 and 2, there is a disclosure of a top plate for a cooking appliance using a low-expansion transparent crystallized glass substrate.

In addition, a decorative layer is formed on a cooking surface of the crystallized glass substrate in order to improve an aesthetic appearance. The decorative layer also has effects of preventing sliding of the cooking device, and flaws owing to friction with the cooking device.

CITATION LIST

Patent Literature 1: JP 2007-165332 A
Patent Literature 2: JP 2007-5318 A

SUMMARY OF INVENTION

Technical Problem

Food or the like is liable to adhere to the cooking appliance, such as an electromagnetic cooking appliance or a gas cooking appliance, to cause proliferation of bacteria or mold. However, the related-art top plates for a cooking appliance do not have an antimicrobial action, and the proliferation of bacteria or mold cannot be suppressed.

The present invention has been made in view of the above-mentioned circumstances, and a technical object of the present invention is to devise a top plate for a cooking appliance having an antimicrobial action.

Solution to Problem

As a result of various investigations, the inventor of the present invention has found that the technical object is achieved by forming a decorative layer on a cooking surface of a crystallized glass substrate and introducing $ZnO$-$B_2O_3$-based glass into the decorative layer. Thus, the finding is proposed as the present invention. That is, firstly, a top plate for a cooking appliance according to one embodiment of the present invention comprises a crystallized glass substrate having a cooking surface on which a cooking device is placed; and a decorative layer formed on the cooking surface, wherein the decorative layer comprises 30 vol % to 100 vol % of $ZnO$-$B_2O_3$-based glass and 0 vol % to 70 vol % of refractory filler powder. Herein, the term "$ZnO$-$B_2O_3$-based glass" refers to glass comprising $ZnO$ and $B_2O_3$ as essential components in a glass composition.

The top plate for a cooking appliance of the present invention comprises the decorative layer formed on the cooking surface. With this, the aesthetic appearance of the top plate for a cooking appliance can be improved. Further, sliding of the cooking device, and flaws owing to friction with the cooking device can also be prevented.

In addition, the top plate for a cooking appliance of the present invention comprises the $ZnO$—$B_2O_3$-based glass in the decorative layer. The $ZnO$—$B_2O_3$-based glass can provide an antimicrobial action to the top plate for a cooking appliance persistently because the $ZnO$—$B_2O_3$-based glass has moderate solubility, and $ZnO$ in the glass composition is eluted as $Zn^{2+}$ ions.

FIG. 1 is a schematic sectional view for illustrating a top plate for a cooking appliance according to one embodiment of the present invention. A top plate 1 for a cooking appliance comprises a crystallized glass substrate 10. The crystallized glass substrate 10 has a cooking surface 11. A decorative layer 20 is formed on the cooking surface 11 of the crystallized glass substrate 10. The decorative layer 20 comprises 30 vol % to 100 vol % of $ZnO$—$B_2O_3$-based glass and 0 vol % to 70 vol % of refractory filler powder. With the decorative layer 20, the aesthetic appearance and antimicrobial action of the top plate 1 for a cooking appliance can be improved. Further, sliding of a cooking device, and flaws owing to friction with the cooking device can also be prevented.

FIG. 2 is a schematic plan view for illustrating a decorative layer in the top plate for a cooking appliance according to the embodiment of the present invention when viewed from a direction perpendicular to a cooking surface. As illustrated in FIG. 2, the decorative layer 20 is a printed sintered layer having a discontinuous portion. Specifically, a regular dot pattern is formed as the decorative layer 20.

Secondly, in the top plate for a cooking appliance according to the embodiment of the present invention, the $ZnO$—$B_2O_3$-based glass preferably comprises as a glass composition, in terms of mass %, 40% to 70% of $ZnO$, 10% or more and less than 40% of $B_2O_3$, 0% to 25% of $SiO_2$, 0% to 20% of $Na_2O$, and 0% to 5% of $Ag_2O$. With this, the antimicrobial action of the decorative layer can be increased.

Thirdly, in the top plate for a cooking appliance according to the embodiment of the present invention, the $ZnO$—$B_2O_3$-based glass preferably comprises as a glass composition, in terms of mass %, 54% to 64% of $ZnO$, 15% or more and less than 40% of $B_2O_3$, 2% to 20% of $SiO_2$, 0.1% to 5% of $Al_2O_3$, and 0.05% to 0.9% of $Ag_2O$, and is preferably substantially free of an alkali component. With this, antimicrobial persistence can be improved while discoloration is suppressed. Herein, the phrase "substantially free of an alkali component" refers to the case in which the content of an alkali component ($Li_2O$, $Na_2O$, and $K_2O$) is 0.1% or less in the glass composition.

Fourthly, in the top plate for a cooking appliance according to the embodiment of the present invention, the refractory filler powder preferably comprises one kind or two or more kinds selected from cordierite, willemite, alumina, zirconium phosphate, zircon, zirconia, tin oxide, mullite, silica, β-eucryptite, β-spodumene, a β-quartz solid solution, and zirconium phosphate tungstate. With this, the thermal expansion coefficient of the decorative layer easily matches the thermal expansion coefficient of the crystallized glass substrate.

Fifthly, in the top plate for a cooking appliance according to the embodiment of the present invention, the decorative layer is preferably formed in a regular dot pattern, and a distance between adjacent dots in the pattern is preferably less than 5 mm. With this, the antimicrobial action can be provided reliably even when water or droplet food adheres thereto.

Sixthly, in the top plate for a cooking appliance according to the embodiment of the present invention, the decorative layer preferably has a thickness of 10 µm or less. With this, even when a difference in thermal expansion coefficient between the decorative layer and the crystallized glass substrate is large, cracks and peeling are easily prevented in the decorative layer.

Seventhly, in the top plate for a cooking appliance according to the embodiment of the present invention, an area of the decorative layer is preferably 5% to 90% of an area of an entirety of the cooking surface when viewed from a direction perpendicular to the cooking surface. With this, the antimicrobial action can be provided while the aesthetic appearance of the top plate for a cooking appliance is improved.

DESCRIPTION OF EMBODIMENTS

Figure 1:
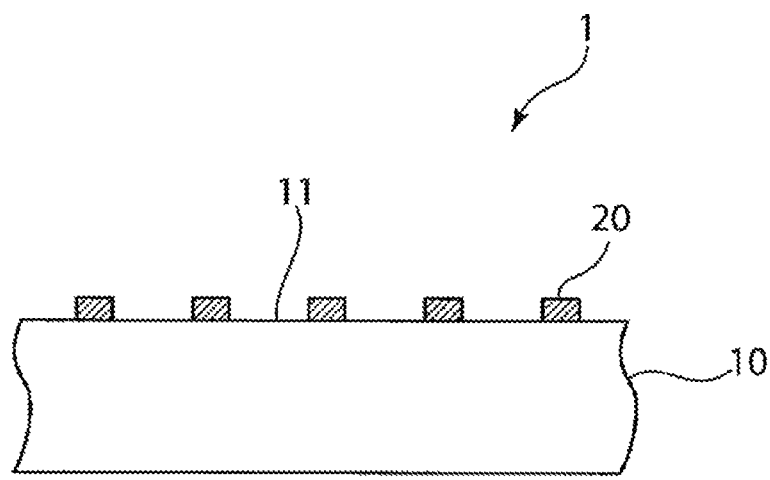
FIG. 1 is a schematic sectional view for illustrating a top plate for a cooking appliance according to one embodiment of the present invention.
Figure 2:
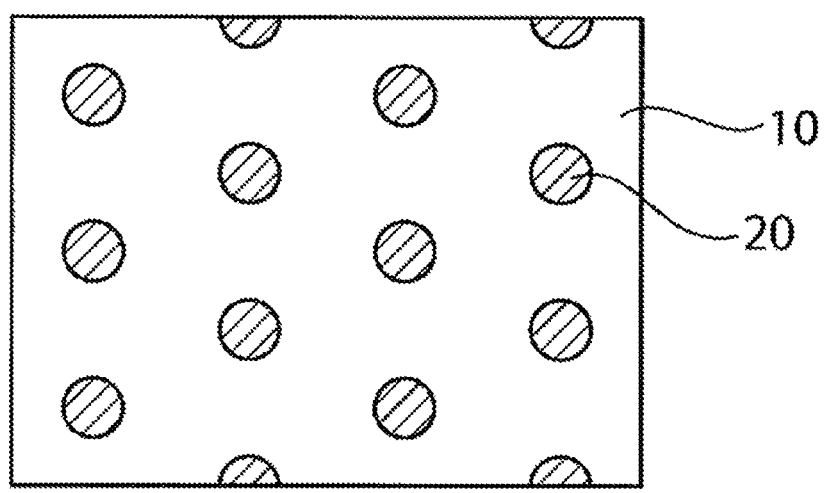
FIG. 2 is a schematic plan view for illustrating a decorative layer in the top plate for a cooking appliance according to the embodiment of the present invention when viewed from a direction perpendicular to a cooking surface.

In a top plate for a cooking appliance of the present invention, a decorative layer comprises at least $ZnO$—$B_2O_3$-based glass, and as required, comprises refractory filler powder, inorganic pigment powder, and the like. The $ZnO$-$B_2O_3$-based glass is a component for providing an antimicrobial action. The refractory filler powder is a component for lowering a thermal expansion coefficient, and is also a component for increasing a mechanical strength. The inorganic pigment powder is a component for improving decorative properties through coloration, such as blackening. In addition to the above-mentioned components, metal powder, such as Cu powder, may be added in order to enhance a color developing property.

The decorative layer comprises 30 vol % to 100 vol % of $ZnO$—$B_2O_3$-based glass and 0 vol % to 70 vol % of refractory filler powder, preferably 50 vol % to 100 vol % of $ZnO$—$B_2O_3$-based glass and 0 vol % to 50 vol % of refractory filler powder, more preferably 70 vol % to 100 vol % of $ZnO$—$B_2O_3$-based glass and 0 vol % to 30 vol % of refractory filler powder, particularly preferably 90 vol % to 100 vol % of $ZnO$—$B_2O_3$-based glass and 0 vol % to 10 vol % of refractory filler powder. When the content of the $ZnO$—$B_2O_3$-based glass is too small (or when the content of the refractory filler powder is too large), the antimicrobial action is liable to be decreased.

The $ZnO$—$B_2O_3$-based glass preferably comprises as a glass composition, in terms of mass %, 40% to 70% of ZnO, 10% or more and less than 40% of $B_2O_3$, 0% to 25% of $SiO_2$, 0% to 20% of $Na_2O$, and 0% to 5% of $Ag_2O$. The $ZnO$—$B_2O_3$-based glass more preferably comprises as a glass composition, in terms of mass %, 54% to 64% of ZnO, 15% or more and less than 40% of $B_2O_3$, 2% to 20% of $SiO_2$, 0.1% to 5% of $Al_2O_3$, and 0.05% to 0.9% of $Ag_2O$, and is more preferably substantially free of an alkali component.

The reasons why the ranges of the contents of the components are restricted as described above are described below. In the descriptions of the ranges of the contents of the components, the expression "%" represents "mass %".

ZnO is a major factor for providing the antimicrobial action as Zn ions. The content of ZnO is preferably from 40% to 70%, from 50% to 66%, from 54% to 64%, or from 55% to 63%, particularly preferably from 57% to 62%. When the content of ZnO is too small, the antimicrobial action is liable to be decreased. In addition, when the content of ZnO is too small, it is necessary to introduce expensive $Ag_2O$ in a large amount in order to increase an antimicrobial power, and a raw material cost is liable to rise. Meanwhile, when the content of ZnO is too large, vitrification becomes difficult.

$B_2O_3$ is a glass forming component, and is also a component that can adjust antimicrobial persistence. The content of $B_2O_3$ is preferably 10% or more and less than 40%, from 15% to 38%, or from 15% to 35%, particularly preferably from 18% to 30%. When the content of $B_2O_3$ is too small, vitrification becomes difficult, and besides the antimicrobial action is liable to be decreased owing to a small elution amount of Zn ions or Ag ions. Meanwhile, when the content of $B_2O_3$ is too large, the antimicrobial persistence is liable to be decreased owing to an excessively large elution amount of Zn ions or Ag ions.

$SiO_2$ is a glass forming component, and is also a component that can adjust antimicrobial persistence. The content of $SiO_2$ is preferably from 0% to 25%, from 1% to 25%, or from 2% to 20%, particularly preferably from 5% to 15%. When the content of $SiO_2$ is too small, vitrification becomes difficult, and besides the antimicrobial persistence is liable to be decreased owing to an excessively large elution amount of Zn ions or Ag ions. Meanwhile, when the content of $SiO_2$ is too large, the antimicrobial action is liable to be decreased owing to a small elution amount of Zn ions or Ag ions.

An alkali component is a component that is liable to cause a decrease in water resistance and an outer appearance defect. Therefore, the contents of $Li_2O$, $Na_2O$, and $K_2O$ are each preferably 20% or less, 10% or less, or 5% or less, particularly preferably 1% or less. It is desired that the $ZnO$—$B_2O_3$-based glass be substantially free of those components. The total content of the alkali component is preferably 20% or less, 10% or less, or 5% or less, particularly preferably 1% or less. It is desired that the $ZnO$—$B_2O_3$-based glass be substantially free of the alkali component.

$Ag_2O$ is a component that increases the antimicrobial action. The content of $Ag_2O$ is preferably from 0% to 5%, from 0% to 3%, from 0.05% to 0.9%, or from 0.1% to 0.9%, particularly preferably from 0.3% to 0.8%. When the content of $Ag_2O$ is too small, it is difficult to exhibit the above-mentioned effect. Meanwhile, when the content of $Ag_2O$ is too large, problems of discoloration through ultraviolet radiation and the like are liable to arise, and besides the raw material cost is liable to rise.

Other than the above-mentioned components, the following components may be included.

$Al_2O_3$ is a component that supports the vitrification, and is also a component that stably retains a Ag component in an ion state. Similar to Si, Al is present in the glass while being coordinated by four oxygen atoms. Al serves as a trivalent cation in the glass, and its valence is lower than that of tetravalent Si by one and therefore Al is present under a state of having a negative ion (−1) charge by a charge balance with oxygen ions. Meanwhile, a Ag ion is a monovalent cation, and is stably supported on an Al site having a monovalent negative ion in a charge compensation state. Ag in an ion state has a high antimicrobial action, but has a significantly high reducing property and hence has a property of stripping off an electron from its surroundings to easily change from an ion state into a metal state. When Ag changes into a metal state, the antimicrobial action is significantly decreased. The content of $Al_2O_3$ is preferably from 0% to 7% or from 0.1% to 5%, particularly preferably from 0.5% to 5%. In addition, it is preferred that the content of $Al_2O_3$ be larger than the content of $Ag_2O$. When the content of $Al_2O_3$ is too small, it becomes difficult to exhibit the above-mentioned effect. Meanwhile, when the content of $Al_2O_3$ is too large, the antimicrobial action is liable to be decreased owing to a small elution amount of Zn ions or Ag ions.

MgO is a component that lowers a viscosity at high temperature under a state of maintaining water resistance. The content of MgO is preferably from 0% to 10% or from 0.1% to 10%, particularly preferably from 1% to 7%. When the content of MgO is too small, it becomes difficult to exhibit the above-mentioned effect. When the content of MgO is too large, vitrification becomes difficult.

CaO is a component that lowers a viscosity at high temperature under a state of maintaining water resistance. The content of CaO is preferably from 0% to 15%, particularly preferably from 0.1% to 10%. When the content of CaO is too small, it becomes difficult to exhibit the above-mentioned effect. When the content of CaO is too large, vitrification becomes difficult.

$P_2O_5$ is a glass forming component, and is also a component that can adjust antimicrobial persistence. The content of $P_2O_5$ is preferably from 0% to 40%, from 0% to 25%, from 0% to 10%, particularly preferably from 0% to 1%. When the content of $P_2O_5$ is too large, the antimicrobial persistence is liable to be decreased owing to an excessively large elution amount of Zn ions or Ag ions.

Components other than the above-mentioned components may be included. For example, SrO, BaO, $TiO_2$, $ZrO_2$, $CeO_2$, and the like may be introduced up to preferably 5%, particularly preferably 1% as a total content of these components or their respective contents.

Various materials may be used as the refractory filler powder, and cordierite, willemite, alumina, zirconium phosphate, zircon, zirconia, tin oxide, mullite, silica, β-eucryptite, β-spodumene, a β-quartz solid solution, and zirconium phosphate tungstate are preferred, and cordierite and willemite are particularly preferred from the viewpoint of compatibility with the $ZnO$—$B_2O_3$-based glass.

The content of the inorganic pigment powder is preferably from 0 mass % to 35 mass %, from 0 mass % to 30 mass %, or from 0 mass % to 25 mass %, particularly preferably from 0.1 mass % to 20 mass %. When the content of the inorganic pigment powder is too large, the content of the $ZnO$—$B_2O_2$-based glass is relatively reduced, and the antimicrobial action is liable to be decreased.

Various materials may be used as the inorganic pigment powder, and examples thereof include: colored oxides, such as NiO (green), $MnO_2$ (black), CoO (black), $Fe_2O_3$ (brownish-red), $Cr_2O_3$ (green), and $TiO_2$ (white); oxides, such as Cr—Al-based spinel (pink), Sn—Sb—V-based rutile (gray), Ti—Sb—Ni-based rutile (yellow), and Zr—V-based baddeleyite (yellow); composite oxides, such as Co—Zn—Al-based spinel (blue), Zn—Fe—Cr-based spinel (brown), and Cr—Cu—Mn-based spinel; and silicates, such as Ca—Cr—Si-based garnet (Victoria green), Ca—Sn—Si—Cr-based sphene (pink), Zr—Si—Fe-based zircon (salmon pink), Co—Zn—Si-based willemite (dark blue), and Co—Si-based olivine (dark blue). Those materials may be mixed at the above-mentioned ratio so that a desired color may be obtained. In addition, other than the above-mentioned inorganic pigment powders, for example, $ZrSiO_4$, talc, or the like may be mixed in an appropriate amount in order to improve concealing properties and abrasion resistance of the decorative layer.

The inorganic pigment powder has an average particle diameter $D_{50}$ of preferably 9 μm or less, particularly preferably from 0.5 μm to 4 μm. The inorganic pigment powder has a maximum particle diameter $D_{max}$ of preferably 10 μm or less, particularly preferably from 2 μm to 8 μm. When the particle size of the inorganic pigment powder is too large, screen printability is liable to be decreased. In addition, the color developing property of the decorative layer is liable to be decreased.

In the top plate for a cooking appliance of the present invention, the decorative layer is formed on a cooking surface of a crystallized glass substrate. For example, a dot (substantially circle) pattern, a rectangular pattern, or a line pattern may be utilized as the decorative layer, and from the viewpoint of improving the aesthetic appearance, a regular dot pattern is preferred. Concerning the size of the pattern, when the decorative layer has a dot form when viewed from a cooking surface side, each dot has a diameter of preferably from 0.5 mm to 5 mm. When the decorative layer has a rectangular form, each rectangle has a side length of preferably from 0.2 mm to 4 mm. Alternatively, when the decorative layer has a lattice form or a line form, a line constituting a lattice or a line in the line pattern has a width of preferably from 0.2 mm to 5.0 mm.

In the case of the regular dot pattern, a distance between adjacent dots is preferably less than 5 mm or less than 3 mm, particularly preferably less than 2 mm. When the distance between adjacent dots is too large, there is a risk in that water or droplet food adhering to the cooking surface is prevented from being brought into contact with the decorative layer, and it becomes difficult to prevent the generation of bacteria, mold, or the like.

In the present invention, the area of the decorative layer is preferably 5% to 90% of the area of the entirety of the cooking surface when viewed from a direction perpendicular to the cooking surface. The area of the decorative layer falls within a range of more preferably from 15% to 80%, still more preferably from 17% to 70%, particularly preferably from 20% to 60%. When the area of the decorative layer is too small, an aesthetic action and the antimicrobial action are liable to be insufficient. In addition, there is a risk in that sliding of a cooking device cannot be suppressed sufficiently.

The decorative layer has a thickness of preferably 10 μm or less, particularly preferably 6 μm or less. In addition, the decorative layer has a thickness of preferably 1 μm or more, particularly preferably 1.5 μm or more. When the thickness of the decorative layer is too large, the decorative layer may be peeled off in some cases. When the thickness of the decorative layer is too small, the aesthetic action and the antimicrobial action may be insufficient in some cases.

For example, the decorative layer according to the present invention is produced as described below. First, glass powder formed of the $ZnO$—$B_2O_3$-based glass (having added thereto the refractory filler powder, the inorganic pigment powder, or the like as required) and a vehicle are kneaded homogeneously with a triple roll mill to produce a powder paste. The vehicle is formed mainly of a solvent and a resin. The solvent is added for the purpose of uniformly dispersing the glass powder or the like while dissolving the resin. The resin is added for the purpose of adjusting the viscosity of the paste. In addition, a surfactant, a thickener, or the like may be added as required.

The following resins may be used as the resin: an acrylic acid ester (acrylic resin), ethylcellulose, a polyethylene glycol derivative, nitrocellulose, polymethylstyrene, polyethylene carbonate, a methacrylic acid ester, and the like. In particular, an acrylic acid ester or ethylcellulose is preferred from the viewpoint of its satisfactory heat decomposability.

The following solvents may be used as the solvent: pine oil, N,N'-dimethylformamide (DMF), α-terpineol, a higher alcohol, γ-butyrolactone (γ-BL), tetralin, butylcarbitol acetate, ethyl acetate, isoamyl acetate, diethylene glycol monoethyl ether, diethylene glycol monoethyl ether acetate, benzyl alcohol, toluene, 3-methoxy-3-methylbutanol, triethylene glycol monomethyl ether, triethylene glycol dimethyl ether, dipropylene glycol monomethyl ether, dipropylene glycol monobutyl ether, tripropylene glycol monomethyl ether, tripropylene glycol monobutyl ether, propylene carbonate, N-methyl-2-pyrrolidone, and the like. In particular, α-terpineol is preferred from the viewpoints of its high viscosity and satisfactory solubility of a resin or the like therein.

Next, the powder paste is applied onto the cooking surface of the crystallized glass substrate with an applicator, such as a screen printer, and then subjected to a drying step and a firing step. With this, the decorative layer can be formed on the cooking surface of the crystallized glass substrate. The conditions of the drying step are generally as follows: at from 70° C. to 150° C. for from 10 minutes to 60 minutes. The firing step is a step of sintering the glass powder while decomposing and volatilizing the resin, to fix the decorative layer onto the surface of the crystallized glass substrate. The conditions of the firing step are generally as follows: at from 650° C. to 850° C. for from 5 minutes to 30 minutes. As the firing temperature in the firing step is lower, firing efficiency is improved more, but fixability between the decorative layer and the crystallized glass substrate lowers more.

In the top plate for a cooking appliance of the present invention, the crystallized glass substrate has a softening temperature of preferably 700° C. or more, particularly preferably 750° C. or more from the viewpoint of preventing breakage caused by thermal shock. In addition, the crystallized glass substrate has an average linear thermal expansion coefficient in a range of from 30° C. to 750° C. of preferably from $-10 \times 10^{-7}/°$ C. to $+30 \times 10^{-7}/°$ C., particularly preferably from $-10 \times 10^{-7}/°$ C. to $+20 \times 10^{7}/°$ C. from the viewpoint of preventing the breakage caused by thermal shock.

The crystallized glass substrate has a thickness of preferably 6 mm or less, particularly preferably 4.5 mm or less. In addition, the crystallized glass substrate has a thickness of preferably 2 mm or more, particularly preferably 2.5 mm or more. When the thickness of the crystallized glass substrate is too large, a distance between a heating source and a cooking device, such as a pot, becomes large in use as a top plate for a cooking appliance of an infrared heating mode or an electromagnetic heating (IH) mode, and heating efficiency tends to be decreased. Meanwhile, the thickness of the crystallized glass substrate is too small, the glass substrate is liable to be broken at the time of cooking owing to an excessively low mechanical strength.

A painted layer having a color tone, such as a pearl tone, or a luster layer formed of Lusterware may be formed on a surface of the crystallized glass substrate opposite to the cooking surface.

EXAMPLES

Now, the present invention is described by way of Examples. The following Examples are merely illustrative. The present invention is by no means limited to the following Examples.

Examples (Sample Nos. 1 to 11) of the present invention are shown in Table 1.

TABLE 1

| Glass composition | Example | | | | | | | | | | |
|---|---|---|---|---|---|---|---|---|---|---|---|
| (wt %) | No. 1 | No. 2 | No. 3 | No. 4 | No. 5 | No. 6 | No. 7 | No. 8 | No. 9 | No. 10 | No. 11 |
| ZnO | 60.0 | 46.2 | 58.8 | 61.8 | 55.0 | 59.4 | 56.1 | 60.9 | 64.8 | 57.5 | 58.7 |
| $B_2O_3$ | 15.0 | 27.1 | 23.9 | 31.5 | 25.0 | 30.2 | 22.8 | 33.1 | 12.9 | 28.5 | 23.9 |
| $SiO_2$ | 15.0 | 0.0 | 11.8 | 2.6 | 10.0 | 4.6 | 17.4 | 5.1 | 11.3 | 7.3 | 10.9 |
| $Ag_2O$ | 0.0 | 0.0 | 0.3 | 0.1 | 0.0 | 0.5 | 0.9 | 0.2 | 0.0 | 0.7 | 0.5 |
| $Na_2O$ | 0.0 | 0.0 | 0.0 | 0.0 | 0.0 | 0.0 | 0.0 | 0.0 | 0.0 | 0.0 | 0.0 |
| MgO | 5.0 | 1.8 | 5.0 | 3.5 | 5.0 | 4.2 | 2.5 | 0.5 | 0.0 | 3.5 | 5.0 |
| CaO | 5.0 | 8.9 | 0.0 | 0.0 | 5.0 | 0.0 | 0.0 | 0.0 | 0.0 | 0.0 | 0.0 |
| $Al_2O_3$ | 0.0 | 0.0 | 0.2 | 0.5 | 0.0 | 1.1 | 0.3 | 0.2 | 0.0 | 2.5 | 1.0 |
| $P_2O_5$ | 0.0 | 16.1 | 0.0 | 0.0 | 0.0 | 0.0 | 0.0 | 0.0 | 12.8 | 0.0 | 0.0 |
| Refractory filler powder | None | Willemite 50 vol % | None | CDR 30 vol % | βQuartz 20 vol % | CDR 30 vol % | None | CDR 30 vol % | Willemite 20 vol % | CDR 20 vol % | None |
| Presence or absence of cracks | ○ | ○ | ○ | ○ | ○ | ○ | ○ | ○ | ○ | ○ | ○ |
| Abrasion resistance | ○ | ○ | ○ | ○ | ○ | ○ | ○ | ○ | ○ | ○ | ○ |
| Antimicrobial activity *Escherichia coli* After treatment at 50° C. for 16 hr. | ○ | ○ | ○ | ○ | ○ | ○ | ○ | ○ | ○ | ○ | ○ |
| Water resistance | ○ | ○ | ○ | ○ | ○ | ○ | ○ | ○ | ○ | ○ | ○ |

Each sample was produced as described below. First, glass raw materials were blended and mixed sufficiently so as to achieve a glass composition shown in Table 1, and then put into a crucible made of a platinum-rhodium alloy and melted at from 1,100° C. to 1,300° C. for 3 hours. After the melting, the resultant was formed into a film having a thickness of about 0.7 mm. The resultant glass film was pulverized with a ball mill, allowed to pass through a sieve having an opening of 75 microns, and further subjected to air classification, to thereby provide glass powder having an average particle diameter $D_{50}$ of 3 μm. The particle size of the glass powder refers to a value measured with a laser diffractometer manufactured by Shimadzu Corporation.

Next, the resultant glass powder (or composite powder of glass powder and refractory filler powder) and a vehicle were mixed, and then uniformly kneaded with a three roll mill, to yield a powder paste. A vehicle obtained by dissolving ethylcellulose in α-terpineol was used as the vehicle, and the mass ratio of composite powder/vehicle was adjusted to from 1 to 2. The "CDR" and "βQuartz" in Table 1 represent cordierite and β-quartz solid solution, respectively.

Next, the powder paste was screen printed on the entirety of one surface (assumed to be a cooking surface) of a transparent crystallized glass substrate (N-0 manufactured by Nippon Electric Glass Co., Ltd., main crystal: β-quartz solid solution, thickness: 4.0 mm, dimensions: 600×400 mm) so that a regular dot pattern was obtained. After that, the resultant was dried at 120° C. for 20 minutes, and then loaded in an electric furnace at 720° C. and fired for 10 minutes, and naturally cooled to room temperature, to thereby form a decorative layer having a thickness of 5 μm. A distance between adjacent dots was set to 1.8 mm, and the area of the decorative layer when viewed from a direction perpendicular to the cooking surface was set to 25% of the area of the entirety of the cooking surface. The decorative layer was subjected to various evaluations.

The presence or absence of cracks was evaluated by observing the decorative layer, and the case in which no cracks were observed was evaluated as "o", and the case in which cracks were observed was evaluated as "x".

The abrasion resistance was evaluated as follows: #1000 sandpaper was used to be reciprocated on the decorative layer 100 times at a load of 1.3 kg and a one-way speed of 100 mm/sec, and the case in which the decorative layer was not peeled off was evaluated as "o", and the case in which the decorative layer was peeled off was evaluated as "x".

An antimicrobial test was performed in accordance with "Film contact method as Test method I for antimicrobial power of antimicrobial products (1998 version): JIS Z2801" from Society of International sustaining growth for Antimicrobial Articles. When test microbes were *Escherichia coli*, the case of an antimicrobial activity of 2.0 or more was evaluated as "o", and the case of an antimicrobial activity of less than 2.0 was evaluated as "x". In addition, the decorative layer was immersed in warm water at 50° C. for 16 hours, and the outer appearance of the decorative layer was visually observed.

As is apparent from Table 1, in Sample Nos. 1 to 11, the decorative layer had a good fixation strength, a good antimicrobial action, and good water resistance.

INDUSTRIAL APPLICABILITY

The top plate for a cooking appliance of the present invention is suitably applicable to a cooking appliance, such as an electromagnetic cooking appliance or a gas cooking appliance. In addition, while the top plate for a cooking appliance of the present invention comprises the crystallized glass substrate, an amorphous glass substrate may be used instead of the crystallized glass substrate when the standard for heat resistance requirement is low.

REFERENCE SIGNS LIST

1 . . . top plate for cooking appliance
10 . . . crystallized glass substrate
11 . . . cooking surface
20 . . . decorative layer

The invention claimed is:

1. A top plate for a cooking appliance, the top plate comprising:
   a crystallized glass substrate having a cooking surface on which a cooking device is placed; and
   a decorative layer formed on the cooking surface,
   wherein the decorative layer comprises 30 vol % to 100 vol % of $ZnO-B_2O_3$-based glass and 0 vol % to 70 vol % of refractory filler powder, and
   wherein the $ZnO-B_2O_3$-based glass comprises as a glass composition, in terms of mass %, 50% to 70% of ZnO, 10% or more and less than 40% of $B_2O_3$, 0% to 25% of $SiO_2$, 0% to 20% of $Na_2O$, 0.1% to 5% of $Al_2O_3$, and 0.05% to 5% of $Ag_2O$, and wherein, in terms of mass %, a content of $Al_2O_3$ is larger than a content of $Ag_2O$.

2. The top plate for a cooking appliance according to claim 1, wherein the $ZnO-B_2O_3$-based glass comprises as the glass composition, in terms of mass %, 54% to 64% of ZnO, 15% or more and less than 40% of $B_2O_3$, 2% to 20% of $SiO_2$, and 0.05% to 0.9% of $Ag_2O$, and 0.1% or less is substantially free of an alkali component.

3. The top plate for a cooking appliance according to claim 1, wherein the refractory filler powder comprises one kind or two or more kinds selected from cordierite, willemite, alumina, zirconium phosphate, zircon, zirconia, tin oxide, mullite, silica, β-eucryptite, β-spodumene, a β-quartz solid solution, and zirconium phosphate tungstate.

4. The top plate for a cooking appliance according to claim 1, wherein the decorative layer is formed in a regular dot pattern, and a distance between adjacent dots in the pattern is less than 5 mm.

5. The top plate for a cooking appliance according to claim 1, wherein the decorative layer has a thickness of 10 μm or less.

6. The top plate for a cooking appliance according to claim 1, wherein an area of the decorative layer is 5% to 90% of an area of an entirety of the cooking surface when viewed from a direction perpendicular to the cooking surface.

* * * * *